July 3, 1951  P. H. ALLEN ET AL  2,558,721
OPTICAL VALUE-COMPARING AND OPERATION CONTROL MECHANISM
Filed May 7, 1946  3 Sheets-Sheet 1
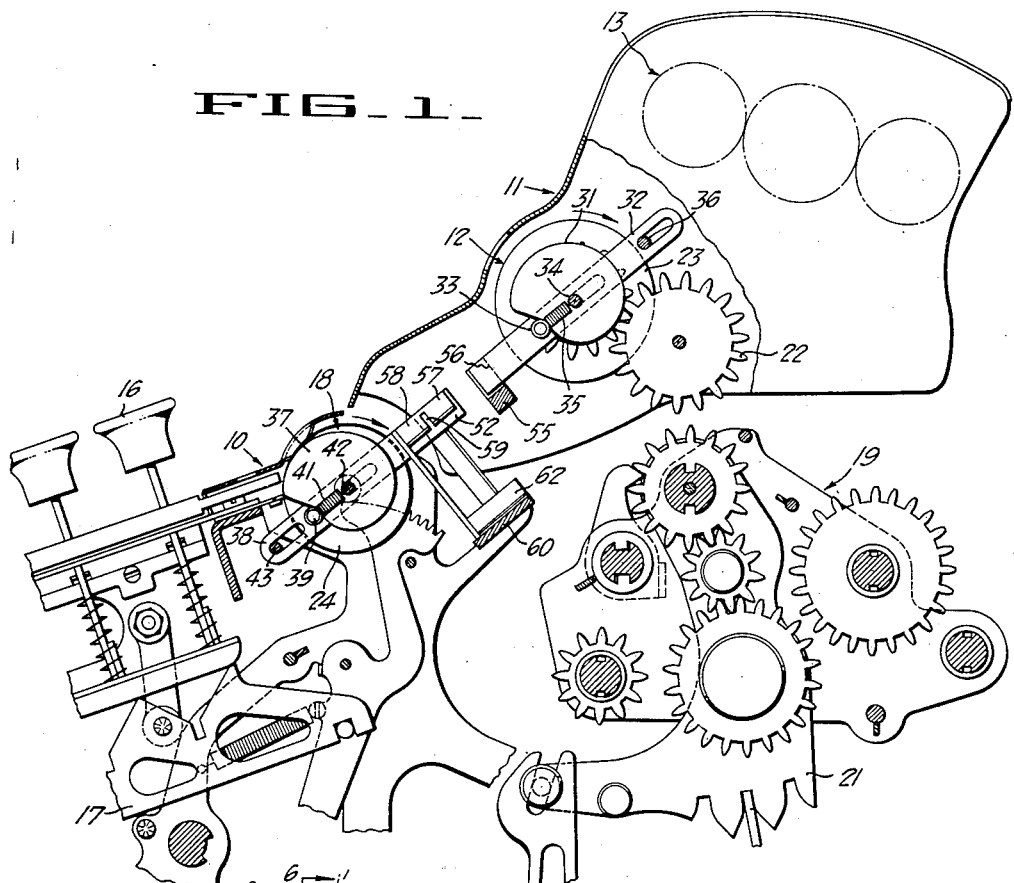
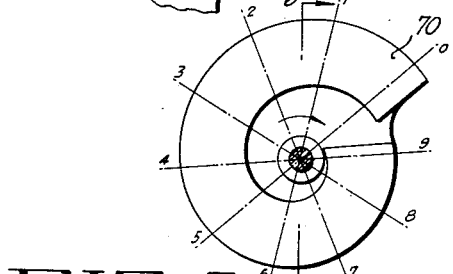
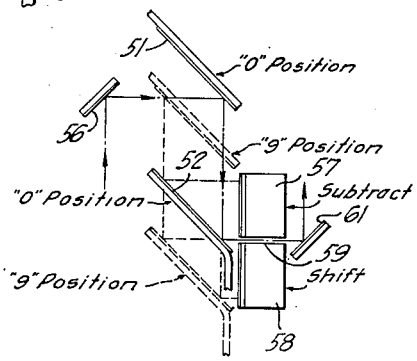
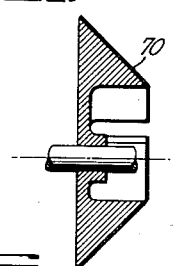
FIG_1_
FIG_5_
FIG_4_
FIG_6_
INVENTORS
Philip H. Allen
Benjamin J. Chromy
BY July 3, 1951 P. H. ALLEN ET AL 2,558,721
OPTICAL VALUE-COMPARING AND OPERATION CONTROL MECHANISM
Filed May 7, 1946 3 Sheets-Sheet 2
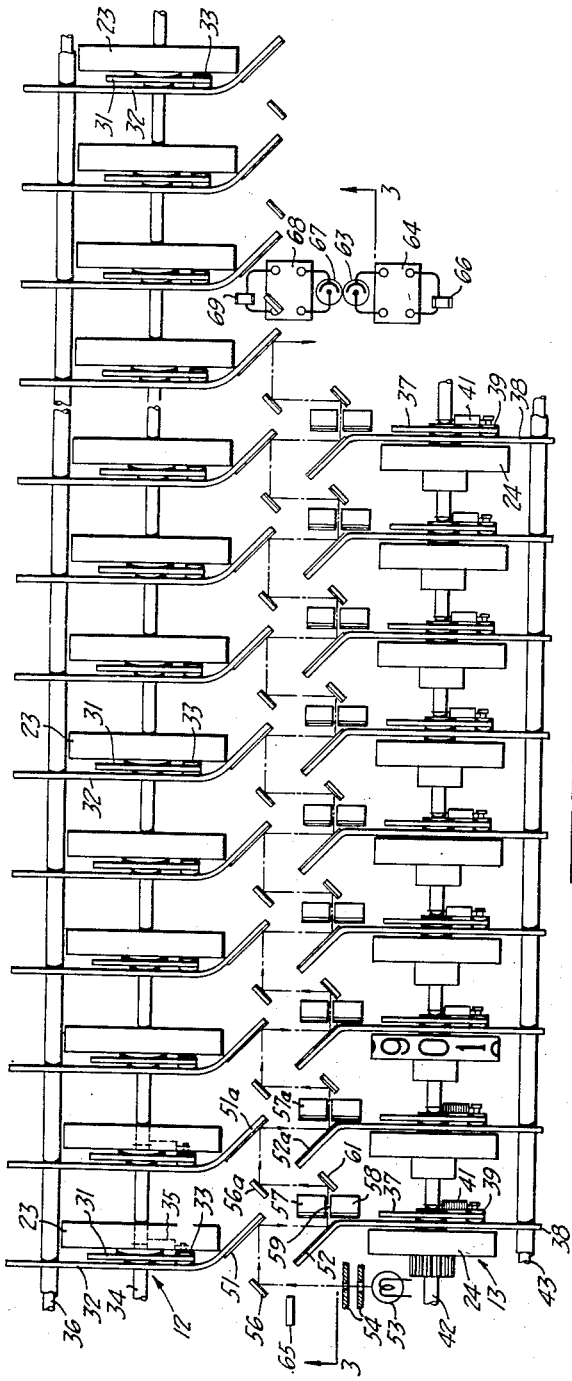
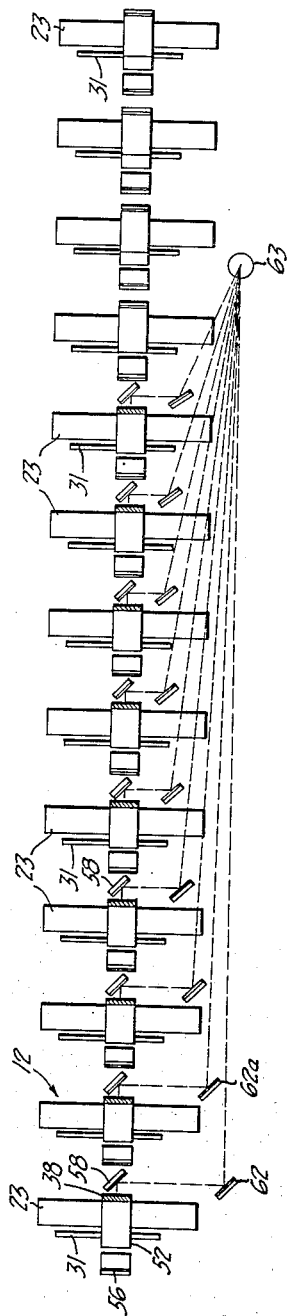
INVENTORS
Philip H. Allen
Benjamin J. Chaney
BY July 3, 1951 P. H. ALLEN ET AL 2,558,721
OPTICAL VALUE-COMPARING AND OPERATION CONTROL MECHANISM
Filed May 7, 1946 3 Sheets-Sheet 3
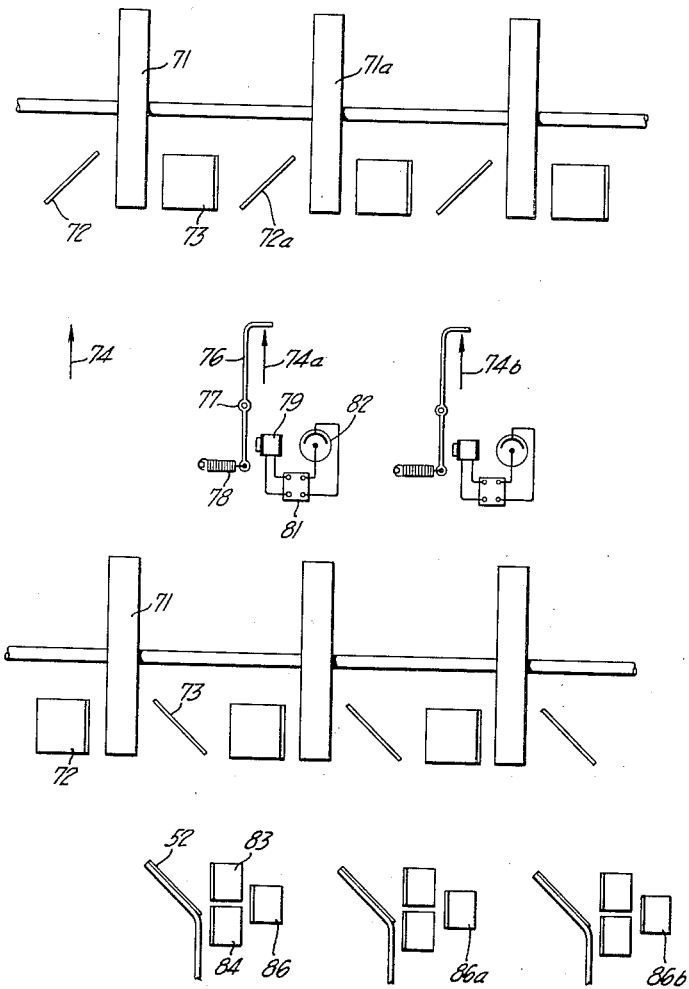
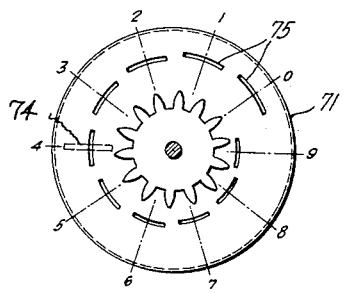
INVENTORS
Philip H. Allen
BY Benjamin J. Chromy Patented July 3, 1951

2,558,721

UNITED STATES PATENT OFFICE 2,558,721

OPTICAL VALUE-COMPARING AND OPERATION CONTROL MECHANISM

Philip H. Allen, Orinda, Calif., and Benjamin J. Chromy, Washington, D. C.

Application May 7, 1946, Serial No. 667,868

10 Claims. (Cl. 235—79)

This invention relates to calculating machines and is concerned more particularly with improved means for performing automatic division in such calculating machines.

It is a general object of the invention to provide an improved automatic division control mechanism for calculating machines which will enable the performance of the division with a minimum number of machine cycles for a given problem.

Another object of the invention is to provide automatic division mechanism of the comparative division type employing an optical-electrical system for comparing the values of the dividend and divisor and for exercising machine control.

A further object of the invention is to provide for the use of light rays in comparing the values of two digits.

Another object of the invention is to provide optical means for sensing the adjusted position of a numeral dial irrespective of limited displacement thereof from an exact numeral indicating position.

Other objects and advantages of the invention will be apparent from the following description of certain preferred embodiments thereof as illustrated in the accompanying drawings, in which:

Figure 1 is a fragmentary longitudinal sectional view of a calculating machine embodying the instant invention.

Figure 2 is a fragmentary plan view illustrating the comparing mechanism provided between the shiftable accumulator or dividend register and the stationary divisor register.

Figure 3 is a fragmentary elevational view taken as indicated by the line 3—3 in Figure 2 illustrating the control exercised from the various comparing orders of the machine for controlling machine operation.

Figure 4 is a diagrammatic view on an enlarged scale of the comparing elements of a single order of the mechanism.

Figure 5 is an elevational view of a modified form of value comparing element.

Figure 6 is a sectional view of the value comparing element of Figure 5 taken as indicated by the line 6—6 in Figure 5.

Figure 7 is a schematic view of a modified form of comparing means for use in comparative division operations.

Figure 8 is a schematic view of the comparing means shown in Figure 7.

Figure 9 is an elevational view of a numeral dial structure employed in Figures 7 and 8.

The instant invention is of general application to various types of calculating machines capable of performing division operations but is shown in connection with a conventional form of "Marchant" calculating machine as illustrated, for example, in the patent of H. T. Avery, 2,216,659, dated October 1, 1940, to which reference is made for portions of the calculating machine not specifically referred to or described herein.

Referring first to Figure 1, there is shown a conventional type of calculating machine including a body 10 in which the keyboard, selecting and actuating mechanisms are mounted and a shiftable register carriage 11 which carries the accumulator or dividend register 12 and the resolutions counter or quotient register 13.

A conventional form of selection mechanism is employed including the value keys 16 cooperating with a selection slide 17 to enter values into the machine as displayed by a conventional form of check dial register 18. The values entered into the machine are set by the selection mechanism into an actuator indicated generally at 19 of the type specifically described in the above Avery patent and including in each order various selection plates, such as indicated at 21, by means of which a selective variable drive of from 1 to 9 increments per cycle can be transmitted through the intermediate or dipping idler gear 22 to the dial 23 of the accumulator 12. This mechanism is of well-known conventional construction and so no detailed description is given.

In performing division operations in accordance with well-known procedures, it is customary to enter the dividend in the accumulator 12 and to enter the divisor into the selection mechanism by the means of the keyboard 16 with the divisor values shown in the dials 24 of the check dial register 18. With these values properly aligned subtraction is performed in any given ordinal position to determine the quotient figure of that order. Also, it has been proposed previously to perform a comparison of the dividend and divisor values to determine after each cycle whether another subtraction can occur or whether a relative shifting should be effected between the dividend and divisor values. An example of such comparative division mechanism is disclosed in the above Avery patent.

In general, in such comparative division mechanisms when the highest digit of the dividend is determined to be larger than the highest digit of the divisor during a sensing or value comparing cycle, the machine is set for subtraction. If these two values are equal, the control is transferred to the comparing mechanism of the next lower order to determine the question of subtraction or shifting. If the divisor digit in the highest order is greater than the corresponding dividend digit, then the shifting mechanism is operated.

In accordance with the instant invention, an optical system is provided for comparing the digit values of aligned orders of the dividend and divisor and for controlling machine operation in accordance with the above described principles. This optical system comprises generally a series of optical elements associated with the dials 23 of the dividend register and a corresponding series of optical elements associated with the dials 24 of the divisor register 18. These optical elements are differentially adjusted to control a light ray to obtain the difference between aligned ordinal values, if a difference exists, and if not, to transmit the light ray to the similar optical elements of the next lower order for use in value comparison.

To carry out the above optical arrangement, each of the dials 23 of the dividend register has associated therewith a snail cam 31 (Figures 1 and 2) adapted to represent the value displayed by the dial, and to adjust correspondingly the slide 32 which carries a roller 33 engaging the cam 31. The slide 32 is mounted for endwise sliding movement on the dial shaft 34 and an auxiliary support shaft 36 and is urged against the snail cam by a spring 35. Correspondingly, each dial 24 of the divisor register has associated therewith a snail cam 37 cooperating with a slide 38 carrying a roller 39 which is held against the snail cam by means of the spring 41. The divisor slide 38 is guided on the dial shaft 42 and an auxiliary support shaft 43 for movement parallel to the aligned dividend slide 32.

As shown in Figures 1 and 2, each of the slides 32 of the accumulator carries an optical reflecting element in the form of a mirror 51 which is disposed at an angle of 45° with respect to path of movement of the slide 32 and also to the axis of the associated dial and is positioned oppositely to a corresponding and similarly oriented mirror or reflecting element 52 carried by the slide 38 associated with the aligned check dial 24. Upon ordinal shifting movement of the register carriage, the groups of mirrors 51 and 52 shift with respect to each other into a new ordinal alignment, but the same cooperative relation remains.

To enable optical comparison of the values of aligned orders of the dividend and divisor, a source of light is provided on the frame of the machine which by means of a lamp 53 and a pair of collimating shutter plates 54 direct a light ray against an aligned mirror or reflecting element 56 on the carriage. The mirror 56 is disposed at an angle of 90° to the mirror 51 and reflects the light ray onto this mirror 51, and from the mirror 51 the light ray is transmitted to the aligned mirror 52 from which it is reflected at right angles to its original path in a manner later described. There is an ordinal series of mirrors 56, 56a, etc. which are supported on a bar 55 of the carriage frame.

Associated with each differentially settable optical element or mirror 52 is an optical system designed to control further value comparison or machine operation in accordance with reflected position of the light ray as controlled by the mirror 52 and the aligned mirror 51. This control system includes a pair of respective "subtract" and "shift" control mirrors 57 and 58 on the frame of the machine which are spaced apart to provide a light transmitting "equal" slot 59. The mirrors 57 and 58 are carried by a suitable support bracket extending upwardly from a transverse frame piece 60. Cooperating with the slot 59 is a reflecting element or mirror 61 which transmits the light ray to a mirror 56a on the carriage similar to the mirror 56, so that when the light ray passes through the "equal" slot 59 it becomes operative with respect to the second highest order of the comparing mechanism, namely, the mirrors 51a and 52a.

The mirrors 57 and 58 are disposed as seen in Figure 3, to direct the light downwardly for control of machine operations, there being a series of lower mirrors 62, 62a, etc., below each set of mirrors 57—58, and so disposed as to reflect the light ray from any of the "shift" mirrors 58 to a light sensitive cell 63 (Figures 2 and 3). The cell 63 has associated therewith an amplifier 64 for operating a relay 66 whenever the light sensitive device 63 is energized. The rearward set of "subtract" control mirrors 57—57a, etc., direct rays from the one of the set of mirrors 62 to a second light sensitive device 67 in an electrical circuit including an amplifier 68 and solenoid 69. The solenoid 66 is associated with the shift clutch of the above identified Avery patent to cause engagement of the shift clutch for one step of left-hand shifting movement of the carriage when energized, while the solenoid 69 is related to the main clutch and subtract controls of the Avery patent to cause one cycle of subtraction when the solenoid 69 is energized. Specifically, the solenoid 69 can be related to the main clutch dog 395 of the Avery patent and to the subtract control member 469 of this patent, or it can be connected to cause depression of the key 860 which operates the main clutch and subtract control of Avery for a single cycle of operation. Also the solenoid 66 may be connected to operate the shift control members 1300 and 1375 of Avery in a counterclockwise direction or to effect depression of the zero multiplier key 2002 which effects a one-step shift of the carriage to the left in the Avery patent.

Referring to Figure 4, there is shown one comparing order for illustrative purposes in which the mirror or reflecting element 51 is shown in its zero position in full lines and in its "9" position in dotted lines, the mirror 52 having a similar showing of its "0" and "9" positions. From the above description and the diagram in Figure 4, it will be seen that when the dividend mirror 51 is in its "9" position and the divisor mirror 52 in its "0" position, the light ray will be reflected to impinge upon the "subtract" reflecting element or mirror 57 so that the light beam will energize the light sensitive device 67 to cause operation of the solenoid 69 and, therefore, cause a subtraction cycle of the machine. When both mirrors are in the "0" positions, the light ray is transmitted through the "equal" slot 59 to the next lower order of the comparison mechanism by means of the mirror 61. This same operation occurs with both mirrors 51 and 52 in their "9" positions. With dividend mirror 51 in its "0" position and mirror 52 in its "9" position, i. e., with a divisor digit greater than the dividend digit, the light ray is transmitted to the shift control mirror 58 and will be transmitted therefrom to the light sensitive device 63 causing energization of the solenoid 66, i. e., the shift solenoid.

From the above description, it is apparent that whenever the values are equal in a given comparing order the light ray will pass through the "equal" slot 59 to the next lower order of the optical comparing system. If the dividend is greater than the divisor in the highest order, the light ray is effective only in this order and is transmitted to energize the subtract solenoid 69. If the dividend digit is less than the divisor digit, the light ray will be transmitted from the highest order comparison means to energize the shift solenoid 66. This sensing operation by means of the light ray to determine whether a shift or a subtraction should occur is performed as a distinct sensing cycle at the end of each shift cycle and at the end of each actuating cycle. It will be noted in each case the actuating clutch or the shift clutch, as the case may be, is energized for only a single cycle so that no overdraft can occur.

In operation of the above comparison division mechanism in connection with machines of the character disclosed in the above-mentioned Avery patent employing the "crawl type" accumulator wherein it is necessary at the end of a registering cycle to compensate overdriving of the numeral dials, it is desirable to employ a distinct sensing cycle for operation of the comparison division mechanism. In this case, for example, the light source 53 would be energized only during the sensing cycle and, if desired, the slides 32 could be moved to inactive position with reference to the snail cams 31 associated therewith during digitation operations in the same manner in which the centralizer pawls and the compensator arms are rocked to inactive position in the Avery patent. Optionally, rather than enabling and disabling the light source 53, a movable shutter system could be employed in conjunction with the light source which would render the light ray effective with respect to the optical comparison system only during the sensing of the division operation.

However, with machines having a sufficient dwell between successive uninterrupted cycles of operation, for example, machines of the type disclosed in the patent to Friden, No. 2,229,889, dated January 28, 1941, it is possible to enable the division comparison system and also set the controls for the ensuing cycle during the dwell occurring between successive digitation operations. In this Friden patent in the division operation as disclosed, the machine cycles continuously throughout the division operation and the change is made from shifting operation to digitation operation "on the fly," and the same type of control may be employed under the operative control of the comparison division mechanism by employing the solenoids 66 and 69 in conjunction with the shifting and subtracting controls of the Friden patent.

To effect stopping operation of the machine in division operations, the carriage 11 may be provided with a suitable cam control for moving a shutter 65 (Figure 2) into and out of the path of the light ray from the lamp or light source 53. The shutter 65 is maintained inactive under control of the sensing mechanism until the end of the sensing cycle for each ordinal division. This same shutter 65 may be moved to active position also by means of a division stop key of the type disclosed in the above-mentioned Avery patent, or when the carriage enters its leftmost position.

Figures 5 and 6 shows a modified form of the optical comparing system in which a "snail cam" mirror 70 is provided on both the dials 23 and 37 so that the light reflecting elements are carried by and movable with the dials themselves for elimination of the slides 32 and 38. If desired, the reflecting surface of each snail cam member 70 may be constructed with ten rectangular reflecting surfaces, each displaced incrementally with respect to the axis of rotation.

In the form of the invention illustrated in Figures 7, 8 and 9, the comparative division mechanism includes a dial element by means of which a light indication of the value standing in the numeral dial of a register is obtained without the necessity for the dial effecting any drive. In this way, the dial structure can be made lighter and can be sensed continuously without interfering with the calculating operation if such continuous sensing is desired. Also the construction is such that for "crawl type" register constructions the dial need not be in its exact value-indicating position to enable correct and exact sensing of the value.

Generally this type of dial sensing is enabled by providing a dial element having light-responsive zones corresponding to the values "0" to "9" and in the instant case these zones are in the form of circumferentially extending slots which are radially displaced in the dial in accordance with the values "0" to "9" to provide a spiral series of slots.

Referring to Figures 7 to 9 the series of dial elements 71 and 71a, etc. of the dividend register are generally similar to those previously described and each dial has associated therewith a pair of optical elements such as the mirrors or reflecting elements 72 and 73 which are disposed on opposite sides of the dial 71. The dial 71 as seen in Figure 9 is provided with ten slots 75 which spiral radially outward from the "9" slots to the "0" slot and each slot subtends an angle of approximately 24° in the present case to provide for the dial being 12° away from its correct position to either side of such position.

Associated with each of the dials is a source of light 74, 74a, 74b, etc. which may be of any suitable construction to provide a narrow band of light such as indicated in dotted lines at 74 in Figure 9 when the light is reflected from the mirror 72 perpendicularly to the plane of the dial element 71. The mirror 73 associated with the dial element 71 corresponds to the mirror 51 described in connection with the preceding modification and cooperates with a mirror 52 adjusted by the aligned dial of the check dial register. In this way the path of the light ray or band 74 is varied or controlled by the optical construction of the dial 71 and the angular position of the mirror 73 and also by the adjustment of the mirror 52 to provide a comparison of aligned ordinal dividend and divisor values. Thus, adjacent the mirror 52 there is provided a shift mirror 84 and a subtract mirror 83 similar to the mirrors 58 and 57 previously described and operating in the same manner.

Associated with the "equal" slot between the mirrors 83 and 84, there is provided a third mirror or reflecting element 86 (Figures 7 and 8) which is so disposed as to reflect a light ray onto a light sensitive cell 82 associated with the light source 74a of the next lower order of the comparison mechanism. As seen in Figure 7 the light source 74a is normally disabled by a shutter 76 which make take the form of a lever pivoted at 77 and urged by a spring 78 to the position shown in Figure 7. The lever 76 forms the armature of a solenoid 79 which is operated through the amplifier 81 from the light sensitive device 82.

Thus, whenever the aligned dividend and divisor digits of the highest order are equal, the light source 74a for sensing the second highest order dividend and divisor values is enabled. Correspondingly the lower order light sources 74b, etc. have similar suitable mechanisms under control of the "equal" mirrors 86a, etc. of the next adjacent higher order. If desired, the light sources 74, 74a, 74b, etc. may be modulated or provided with different frequencies, and a single amplifier 81 may be utilized with an input from each of the light sensitive cells, or from a single light sensitive cell which is positioned to receive light from all of the "equal" mirrors 86 of a series. In this case the solenoids 79, 79a are of a tuned construction to be responsive only to the frequency of current generated from its controlling light source. Such a system is shown in our co-pending application Serial No. 685,572, filed July 22, 1946.

In carrying out division under the method disclosed herein, the operator in installing the problem into the machine should have a zero value to the left of the highest order divisor value, so that where the two initial digits of a dividend are of less value than the initial digit of the divisor and the highest order digits are compared, the next comparing operation will compare the highest order digit of the dividend with the zero value in the divisor so that a subtraction will occur in the division operation. Also, in problems where after repeated shifting and subtraction the remainder of the dividend is exactly equal to the divisor so that all orders of the comparison mechanism will show an equal value and no subtraction will occur. When this condition occurs, the operator knows that the division problem quotient is exactly one too small in the lowest order so that this extra one is added to the quotient in the proper order to obtain the correct quotient figure.

While we have shown certain preferred embodiments of the invention it will be apparent that the invention can be embodied in other forms, and it should be limited only by the scope of the claims appended hereto.

We claim:

1. In a calculating machine, an optical device representing an ordinal dividend value, a second optical device representing an ordinal divisor value, means for establishing a light ray to impinge upon one of said devices for differential positioning thereby and for subsequent impingement upon the other of said devices for differential positioning thereby to compare said values and to influence said ray to one zone when said divisor value is greater than said dividend value and to another zone when said dividend value is greater than said divisor value, and means including respective optical elements in said respective zones responsive to the position of said light ray for controlling a calculating operation.

2. In a calculating machine, an optical device representing an ordinal dividend value, a second optical device representing an ordinal divisor value, means for establishing a light ray to impinge upon one of said devices for differential positioning thereby and for subsequent impingement upon the other of said devices for differential positioning thereby to compare said values and to influence said ray to one zone when said divisor value is greater than said dividend value and to a second zone when said dividend value is greater than said divisor value and to a third zone when the values are equal, and means including respective optical elements in said respective zones responsive to the position of said light ray for controlling a calculating operation.

3. In a calculating machine having a dividend register, register shifting means, and register actuating means, an optical element differentially adjustable in accordance with the value in an order of said dividend register, a divisor register, a second optical element differentially adjustable in accordance with the value in an order of said divisor register aligned with said dividend order, means for establishing a light ray to impinge upon one of said optical elements and to be directed thereby upon the other of said elements whereby the re-directed light ray is positioned in accordance with the difference in said values, and optical means responsive to the character of the difference in said values for selectively controlling operation of said shifting means and said actuating means.

4. In a calculating machine having a dividend register, register shifting means, and register actuating means, means for establishing a light ray, means for differentially controlling the path of the light ray in accordance with a value in said dividend register, a divisor register, means for differentially controlling the path of the light ray in accordance with a value in said divisor register to compare said values, and means controlled by the light ray in response to the joint control thereof by said controlling means for selectively controlling said shifting means and said actuating means.

5. In a calculating machine having a dividend register, register shifting means, and register actuating means, control means including an ordinal array of differentially adjustable optical elements controlled by said dividend register, a divisor register, a second ordinal array of differentially adjustable optical elements controlled by said divisor register and disposed in ordinal alignment with said first array, means for establishing a control sensing light ray for cooperation with said optical elements, and optical-electrical division control means responsive to said light ray.

6. In a calculating machine having a dividend register, register shifting means, and register actuating means, control means including an ordinal array of differentially adjustable optical means controlled by said dividend register, a divisor register, differential optical means controlled by said divisor register and disposed in ordinal alignment with said first array, means for establishing a control sensing light ray for cooperation with said optical means, and optical-electrical division control means responsive to said light ray.

7. In a calculating machine having a dividend register, register shifting means, and register actuating means, control means including an ordinal array of differential light-responsive means controlled by said dividend register, a divisor register, a second ordinal array of differential light-responsive means controlled by said divisor register and disposed in ordinal alignment with said first array, means for establishing a control sensing light ray for cooperation with said light-responsive means, and optical-electrical division control means responsive to said light ray.

8. In a calculating machine having a dividend register, register shifting means, register actuating means, division control means including an ordinal array of differential optical means controlled by the respective orders of said dividend register, a divisor register, a second ordinal array of differential optical means controlled by the respective orders of said divisor register, means for establishing a control sensing light ray for cooperation with said optical means, an optical control system associated with each order of said second ordinal array for receiving the light ray therefrom and for sensing from the position of the light ray the requirement for a shifting operation or for a subtracting operation, and including means for establishing a control light ray in the next lower order of the division control means when the values of the divisor and dividend are equal in a given order.

9. In a calculating machine having a dividend register, register shifting means, register actuating means, an optical element differentially adjustable in accordance with the value standing in an order of said dividend register, a divisor register, a second optical element disposed parallel to said first optical element and adjustable differentially in accordance with the value standing in an order of said divisor register aligned with said dividend order, means for establishing a light ray to impinge upon said first optical element and to be transmitted thereby to said second optical element, to be positioned in accordance with the difference thereof, and optical means for receiving the light ray from said second optical element including means responsive to the character of the difference in said value as represented by the position of the light ray for causing selective operation of said shifting means or said actuating means.

10. In a calculating machine having a register, differential selection mechanism associated therewith, register shifting means, and actuating means, an ordinal array of differentially adjustable optical elements carried by said register, a cooperating ordinal array of differentially effective optical elements associated with said selection mechanism and positioned for alignment with said first-named array, means for establishing a light ray to impinge upon the highest order of aligned optical elements of said arrays, and means responsive to the position of said light ray as controlled by said arrays of elements for controlling said shifting means and said actuating means during a division calculation.

PHILIP H. ALLEN.
BENJAMIN J. CHROMY.

REFERENCES CITED

The following references are of record in the file of this patent:

UNITED STATES PATENTS

| Number | Name | Date |
|---|---|---|
| 2,154,495 | Dahlberg | Apr. 18, 1939 |
| 2,211,736 | Avery | Aug. 13, 1940 |
| 2,216,659 | Avery | Oct. 1, 1940 |
| 2,221,063 | Teague et al. | Nov. 12, 1940 |
| 2,229,889 | Friden | Jan. 28, 1941 |
| 2,242,699 | Flader | May 20, 1941 |
| 2,279,337 | Niemann | Apr. 14, 1942 |
| 2,279,456 | Friden et al. | Apr. 14, 1942 |
| 2,339,616 | Chase | Jan. 18, 1944 |
| 2,398,904 | Libman, et al. | Apr. 23, 1946 |
| 2,432,527 | Lang | Dec. 16, 1947 |
| 2,497,042 | Henri-Georges Doll | Feb. 7, 1950 |

FOREIGN PATENTS

| Number | Country | Date |
|---|---|---|
| 446,338 | Great Britain | Apr. 27, 1936 |